F. GOUBERT.
FASTENER.
APPLICATION FILED JUNE 25, 1917.
1,266,583.
Patented May 21, 1918.
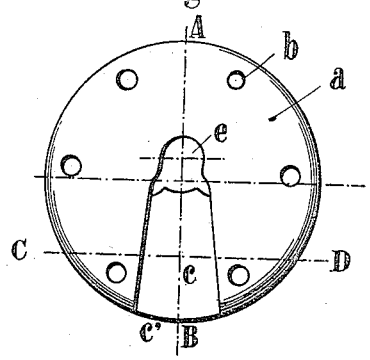
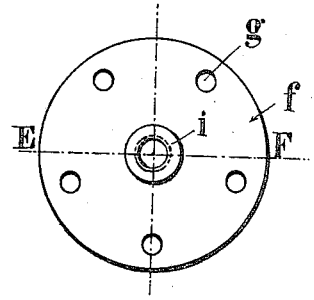
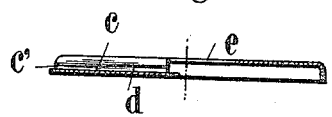
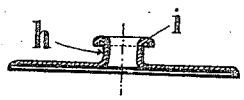
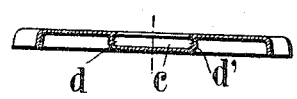
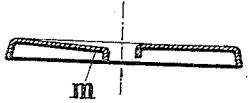
INVENTOR
Floris Goubert
BY
Emil Boinel[?]
ATTORNEY.

UNITED STATES PATENT OFFICE.

FLORIS GOUBERT, OF PARIS, FRANCE.

FASTENER.

1,266,583.  Specification of Letters Patent. Patented May 21, 1918.

Application filed June 25, 1917. Serial No. 176,917.

*To all whom it may concern:*

Be it known that I, FLORIS GOUBERT, a citizen of the Republic of France, residing at Paris, France, have invented certain new and useful Improvements in Fasteners, of which the following is a specification.

The present invention has reference to fasteners, and more particularly to that type of fastener wherein the engagement or coupling together of the two component members of the fastener is maintained by means of spring pressure exerted by one of said members upon the other incidental to such coupling. The invention comprehends, briefly, an extremely simple and effective fastener of the character specified, whose members may be manufactured at low cost, may be easily and quickly coupled and uncoupled, and, when coupled, will retain their engaged position with sufficient tenacity to preclude accidental displacement under ordinary conditions.

An embodiment of the invention is illustrated in the accompanying drawings, in which:

Figure 1 is a plan view of the female member of the fastener.

Figs. 2 and 3 are sections taken, respectively, on lines A—B and C—D, Fig. 1.

Fig. 4 is a plan view of the male member of the fastener.

Fig. 5 is a section on line E—F, Fig. 4.

Fig. 6 is a sectional view of a modified form of female member.

Referring more particularly to said drawing, the aforesaid female member comprises a disk or plate-like body $a$, which is provided adjacent its periphery with a series of holes $b$ for the passage of threads or other fastening means therethrough to attach the member to the supporting fabric or the like with which it is to be used. This plate is stamped out in such a way as to form a radial passage way or channel $c$, which opens at $c'$ through the peripheral wall of the plate, and terminates at its inner end in a socket or opening $e$, the latter being located at approximately the center of the plate, and formed by cutting away the ends of the walls of the channel $c$, as shown in Figs. 1 and 2. The said channel tapers in width from its outer to its inner end, and may, if desired, be produced by simply pressing or bending down a part of the stamped or punched-out plate, as shown in the modification illustrated in Fig. 6, wherein such channel is indicated at $m$. This channel is inclined downward, from its outer to its inner end, and, of course, terminates at the latter end in a socket or opening.

The male member of the fastener likewise consists of a plate or disk $f$, perforated adjacent its periphery to form the holes $g$ for the threads. This plate $f$, however, is provided with an axial, upwardly-projecting tubular post or stud $h$, having an enlargement or head which is here shown as formed by the beaded or rolled upper edge $i$. (Figs. 4 and 5).

In coupling the two members of the fastener together, the stud $h$ is slid along the tapered channel, during which movement the bead or roll $i$ on said stud will ride against the side walls $d$, $d'$ of said channel. As the stud approaches the inner end of the channel, its bead $i$ is forced to spread the walls $d$, $d'$ apart, in order to reach the socket $e$, due to the fact that the distance between the inner portions of said walls is less than the diameter of the bead or rolled edge of the stud; and it is this forcible separation or spreading apart of the said walls which creates the pressure for keeping the members fastened together, since the beaded edge of the stud cannot escape from the socket, as its diameter exceeds that of the socket.

To uncouple the aforesaid members, it is sufficient to forcibly slide one of them relatively to the other in the opposite direction from that which took place during coupling. This will cause the beaded edge of the stud to again force the walls $d$, $d'$ of the channel apart, and the stud can then slide along said channel and leave the same through the open end $c'$ thereof.

The two members of the fastener having been attached to their respective strips or pieces of fabric or other material, the introduction of the stud into the socket may take place either by sliding said members in opposite directions, or by traction exerted upon the two edges of the strips to be fastened. Similarly, the withdrawal of the stud may be effected either by pressure or by traction exerted in the opposite direction from that imposed to effect coupling.

The fastener may be constructed of any suitable material; for example, metal, celluloid, etc., and its various parts may have any desired shape, so long as they are capable of accomplishing the functions above described.

I claim as my invention:—

A fastener, comprising coöperating, disk-like male and female members; the male member being provided with an upstanding stud having an enlarged upper end; and the female member being provided with a socket for the reception of said stud having a diameter less than that of the enlarged end of the stud, and being also provided with a tapered channel which leads radially into said socket from the periphery of said female member and along which said stud is adapted to travel to effect such reception, said channel having spring sides which are formed integral with the female member and the distance between the inner portions of which is less than the diameter of said enlarged stud end, so that the latter will spread said portions apart during its entrance into said socket.

In testimony whereof I affix my signature.

FLORIS GOUBERT.

Copies of this patent may be obtained for five cents each, by addressing the "Commissioner of Patents, Washington, D. C."